United States Patent [19]

Hillman

[11] Patent Number: 4,659,124

[45] Date of Patent: Apr. 21, 1987

[54] TOW BAR FOR TAILWHEEL AIRCRAFT

[76] Inventor: Billy R. Hillman, P.O. Box 132, Castlewood, Va. 24224

[21] Appl. No.: 823,457

[22] Filed: Jan. 28, 1986

[51] Int. Cl.$^4$ .......................... A47F 13/06; B25J 1/02
[52] U.S. Cl. .................................................. 294/19.1
[58] Field of Search ................... 294/19.1, 19.3, 19.2, 294/99.1, 110.1, 110.2, 129, 130, 106, 86.27; 280/493, 501, 481, 504

[56] References Cited

U.S. PATENT DOCUMENTS

| | | | |
|---|---|---|---|
| 465,069 | 12/1891 | Reid | 294/19.3 |
| 579,333 | 3/1897 | Smith | 294/19.3 |
| 1,452,679 | 4/1923 | Fisher | 294/19.2 |
| 2,944,837 | 7/1960 | Fotheringham | 294/19.1 |
| 3,669,427 | 6/1972 | Curtis | 294/19.2 |

Primary Examiner—James B. Marbert
Attorney, Agent, or Firm—Diller, Ramik & Wight

[57] ABSTRACT

A tow bar particularly adapted for use with tailwheel aircraft which includes an elongated rod, a handle at one end, a pair of clamping members pivotally connected at an opposite end, the clamping members each being of a generally u-shaped configuration defined by a pair of spaced arms, a bight therebetween, and a tail, a pivot pin connecting the clamping members to the rod, first and second arms of each clamping member having respective first and second noses, the first noses being overlapped in a closed position of the clamping members to embrace a tailwheel aircraft tailspring therebetween, the second noses of each clamping member being effective to contact the aircraft tailwheel tailspring to move the clamping members from an open to the closed position thereof, and an over-the-center spring for holding the clamping members in the open position and biasing the clamping members to the second position after passing an over-the-center plane through the pivot.

8 Claims, 5 Drawing Figures

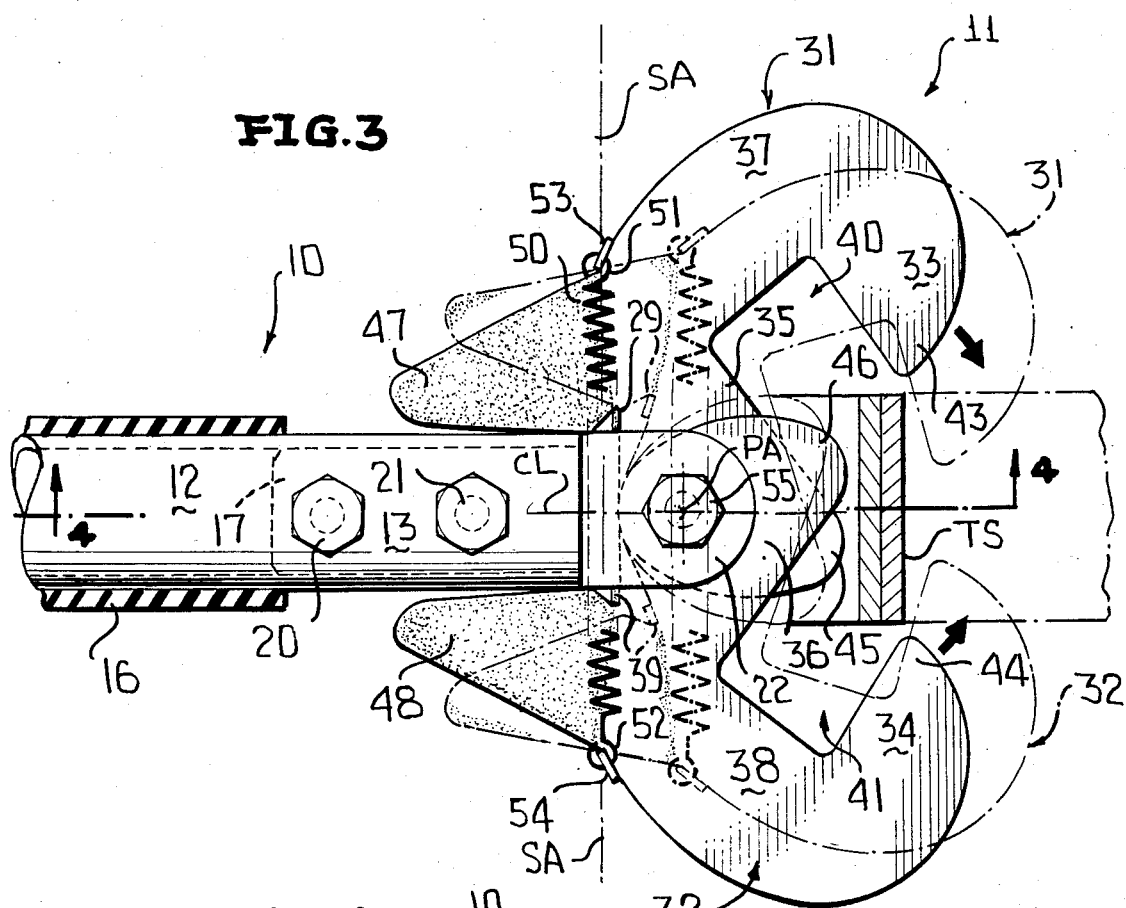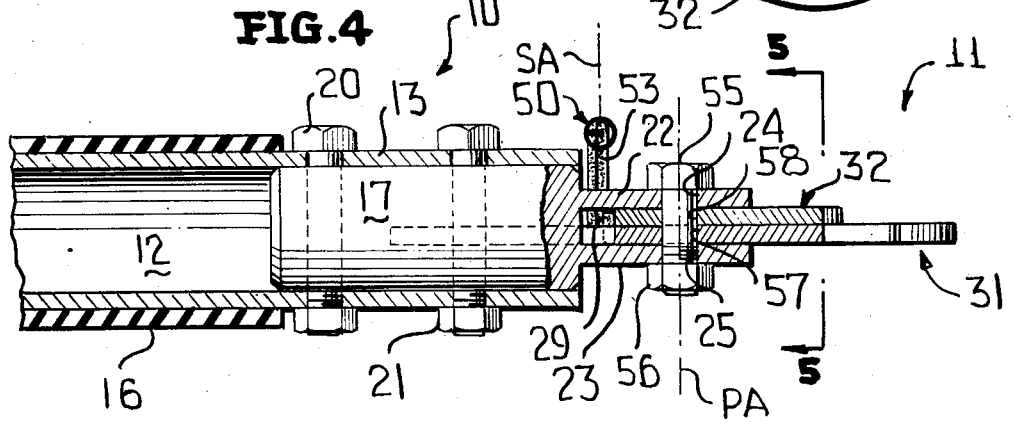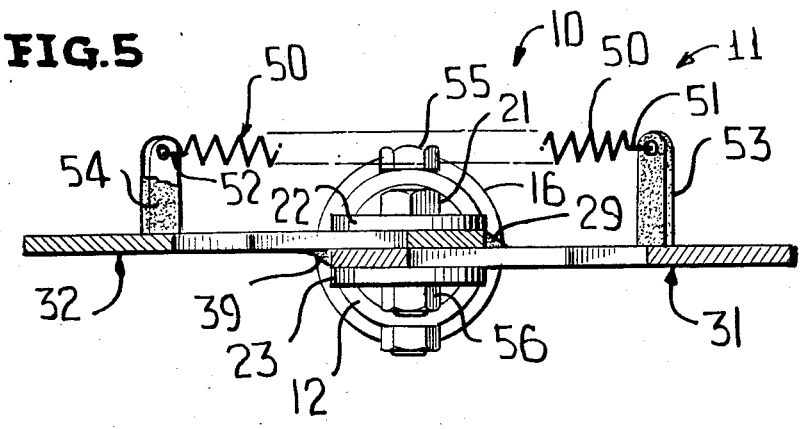

TOW BAR FOR TAILWHEEL AIRCRAFT

BACKGROUND OF THE INVENTION

This invention relates to tow bars for attachment to the tailsprings of tailwheel aircraft for manually moving aircraft as, for example, moving aircraft into and out of hangars.

SUMMARY OF THE INVENTION

The tow bar of the present invention is particularly designed for use with tailwheel aircraft such as a Cessna 120, 140 and 170, a Taylorcraft BC 12D, and Aeronca 7AC, 11AC, a Stinson 108 or the like. In all such conventional aircraft or airplanes the tail section is supported by a tail wheel through a tailspring. In keeping with the present invention the novel tow bar is designed to be clamped in a releasable fashion to such tailsprings for moving the aircraft on the ground by simply pushing, pulling, turning, etc. the tow bar as need be to position the aircraft as desired.

The novel tow bar of this invention is specifically designed for low cost manufacture and sale, maintenance free use, and relatively simplified automatic clamping and relatively low-force unclamping through a novel clamping mechanism formed by a pair of clamping members each of a generally U-shaped configuration defined by first and second arms and a bight therebetween collectively defining a slot, each of the arms terminating in a nose, one of the arms of each clamping member being pivoted to a bar, the other arm noses of each clamping member overlap to thereby bring the clamping members into encircling clamping relationship to an associated aircraft tailwheel tailspring, and biasing means in the form of a spring for normally holding the clamping members in open position yet being moved through a dead-center position to move the clamping members automatically to their closed or clamping position.

In further accordance with the invention, a tail of each of the U-shaped clamping members is normally brought into engagement with an end of the tow bar and is held thereat by the spring to normally maintain the clamping members in their open position.

Still another object of the present invention is to provide a novel tow bar as aforesaid wherein noses of a second of each of the arms of each of the clamping members are so positioned that upon contacting the aircraft tailwheel tailspring and being forcefully moved thereagainst, the forces of reaction automatically act against the spring force to bring the clamping members to their closed position.

With the above, and other objects in view that will hereinafter appear, the nature of the invention will be more clearly understood by reference to the following detailed description, the appended claims and the several views illustrated in the accompanying drawings.

BRIEF DESCRIPTION OF THE DRAWINGS

FIG. 3 is an enlarged fragmentary top plan view of the right-hand most end of the tow bar of FIG. 2 and illustrates the clamping members in solid lines in their fully open position and in phantom outline at an intermediate position at which a spring connected therebetween is generally at its dead-center position relative to the axis of the pivot pin pivotally connecting the clamping members to the bar.

FIG. 4 is a cross sectional view taken generally along line 4—4 of FIG. 3, and illustrates the manner in which the clamping members are pivotally connected to each other and to the tow bar.

FIG. 5 is a cross sectional view taken generally along line 5—5 of FIG. 4, and illustrates the manner in which the spring spans the rod and is connected to tabs of the clamping members.

DESCRIPTION OF THE PREFERRED EMBODIMENT

Figure 1:
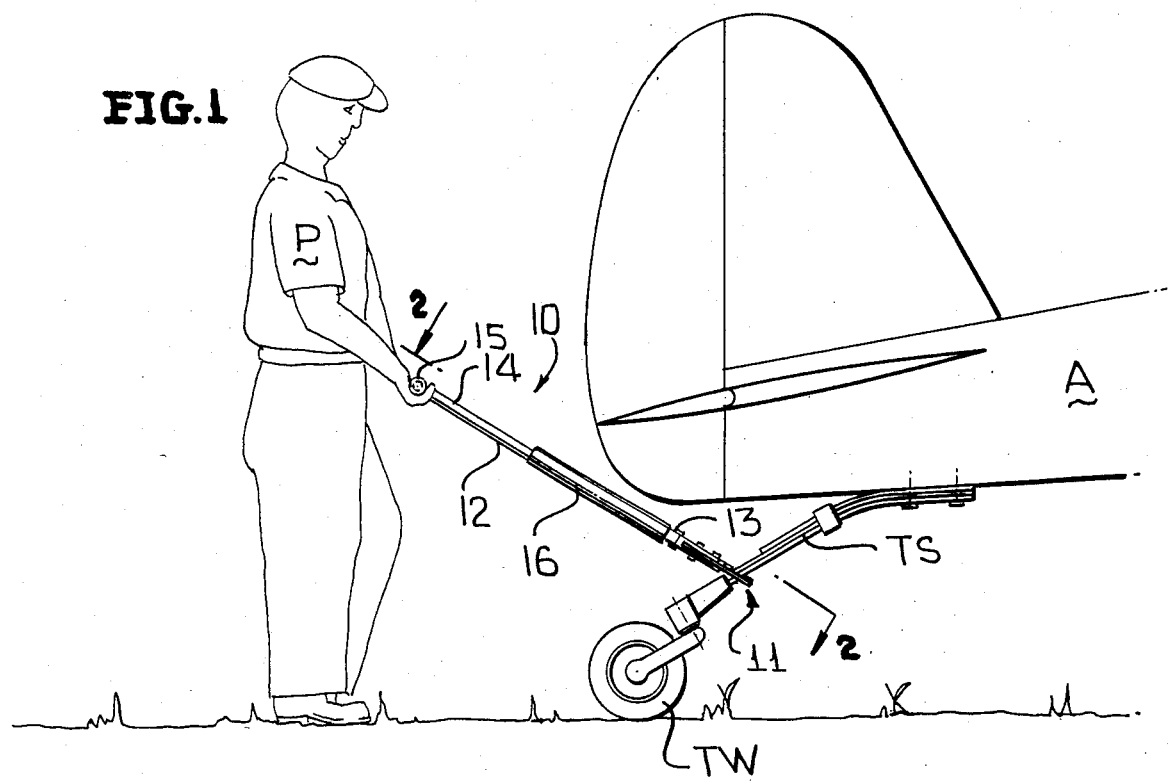
FIG. 1 is a side elevational view of a novel tow bar constructed in accordance with this invention, and illustrates the manner in which the tow bar is clamped to a tailspring of a tailwheel aircraft so as to enable the latter to be manually maneuvered.

A novel tow bar particularly adapted for use with tailwheel aircraft or airplanes is illustrated in its operative position in FIG. 1 and is generally designated by the reference numeral 10.

The tow bar 10 is shown attached by clamping means 11 to a tailspring TS carrying a tailwheel TW associated with a conventional tailwheel aircraft A, such as a Cessna 120, 140 or 170; a Taylorcraft BC12D; a Stinson 108, an Aeronca 7AC, 11AC, or the like. The particular aircraft A is of no consequence so long as it includes a tailspring TS which can be grasped by the clamping means 11 of the tow bar 10 so that a person P can maneuver the aircraft A on the ground as might be necessary or desirable to, for example, move the aircraft A into or out of an associated hangar.

The tow bar 10 (FIGS. 2-5) includes a tubular bar, rod, tube or elongated member 12 having a first end or end portion 13 and a second end or end portion 14 to the latter of which is welded a cross bar or handle 15. A tubular sleeve 16 of nonmarring plastic material, rubber or the like is in external sliding relationship upon the elongated member 12, and the purpose thereof is to prevent the aircraft A or any of its parts from being damaged, as might otherwise occur if the bar 12 were not covered and would strike the aircraft A. The sleeve 16 is also preferrably formed of material which is soft, resilient and/or cushiony so that impact forces created upon striking the aircraft A will be absorbed and the aircraft A will be relatively undamaged.

A cylindrical metallic plug 17 (FIG. 4) is inserted into the end portion 13 of the elongated member 12 and is connected thereto by conventional nuts and bolts 20, 21. The plug 17 can be, of course, welded to the end portion 13 thereby eliminating the nuts and bolts 20, 21. A pair of ears 22, 23 are welded to the plug 17 and are positioned in generally parallel spaced relationship to each other. Each of the ears 22, 23 includes a bore or opening 24, 25 respectively.

The clamping means 11 includes a pair of clamping members 31, 32 having portions thereof sandwiched between the ears 22, 23 (FIG. 4). The clamping members 31, 32 are identically constructed from metallic material and each is of a generally U-shaped configuration. The clamping members 31, 32 include respective first arms 33, 34, respective second arms 35, 36 and respective bights 37, 38 which collectively define or set off therebetween respective slots, openings or notches 40, 41. The arms 33, 34 terminate in ends or noses 43, 44 whereas the arms 35, 36 terminate in respective ends or noses 45, 46. While the clamping members 31, 32 are generally U-shaped in configuration, respective projections or tails 47, 48 thereof impart a generally u-shaped configuration to each of the clamping members 31, 32.

Figure 2:
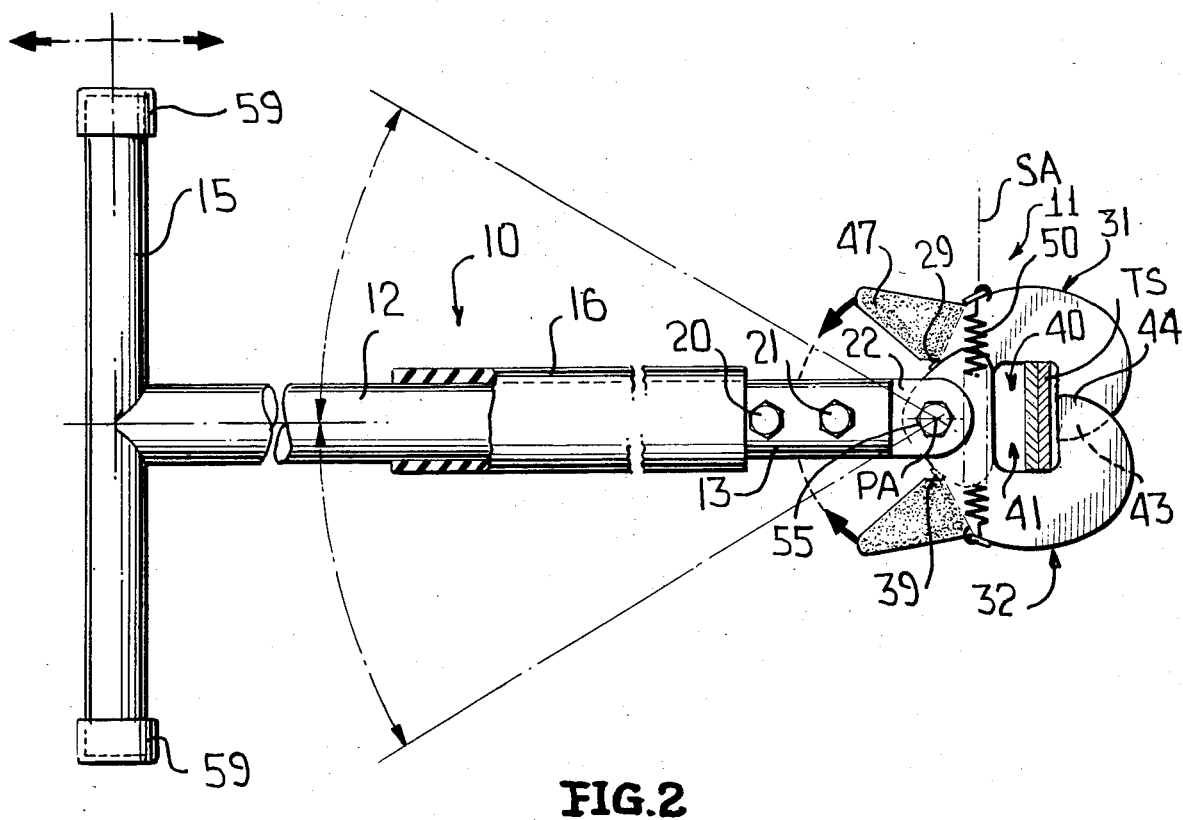
FIG. 2 is an enlarged fragmentary top plan view taken generally along the line 2—2 of FIG. 1 with parts broken away for clarity, and illustrates a pair of generally U-shaped clamping members in embracing, encircling, clamping relationship to the tailspring of the aircraft.

Spring means 50 in the form of a coil spring having ends 51, 52 is connected by the latter to upstanding tabs 53, 54 of the respective clamping members 31, 32. Pivot means in the form of a headed, threaded bolt 55 carrying a nut 56 passes through the openings 24, 25 (FIG. 4) and openings 57, 58 in the respective clamping members 31, 32 to pivotally connect the latter relative to each other and to the ears 22, 23 of the elongated member 12. The latter pivotal connection permits the clamping members 31, 32 to move between the fully opened position thereof shown in solid outlines in FIG. 3 and the fully closed position thereof shown in FIG. 2, as well as the numerous intermediate positions therebetween, one of which is the dead-center position of the clamping members 31, 32 which is illustrated in phantom outline in FIG. 3. The latter position is a position at which an axis SA of the spring 50 is in the same plane as an axis PA of the pivot means or bolt 55. When in this phantom outline position the force of the spring 50 will be neutralized and essentially will hold the clamping members 31, 32 in the phantom outline position. However, if the spring 50 is moved to the left or to the right of the position illustrated in FIG. 3, the biasing force of the spring 50 will automatically move the clamping members 31, 32 to the fully opened position (solid lines in FIG. 3) or the fully closed position (FIG. 2).

Reference is made to a center line CL (FIG. 3) of the elongated member or rod 12 which passes through the axis PA of the bolt or pivot means 55. As is best illustrated in FIG. 3, the noses 44, 46 are generally at opposite sides of the center line CL as are the noses 43, 45. Moreover, the nose 45 is below the center line CL, as viewed in FIG. 3, and the nose 46 is above the center line CL, again as viewed in FIG. 3. Thus, any force acting against the noses 45, 46 from right to left as viewed in FIG. 3, will automatically cause the clamping members 31, 32 to pivot clockwise and counterclockwise, respectively, from their open to their closed position. It is just such forces imparted by pushing the noses 45, 46 against the tailspring TS that automatically brings the clamping members 31, 32 to the clamping or closed position shown in FIG. 2. As an example, assuming that the clamping members 31, 32 are in the open solid line position of FIG. 3, the person P simply maneuvers the noses 43, 44 past the spring TS until the noses 45, 46 contact the spring TS. After such contact is made the tow bar 10 is pushed forward toward the tailspring TS at which time the reaction forces operate to the left, as viewed in FIG. 3, against the noses 45, 46 causing the progressive clockwise and counterclockwise pivoting, respectively, of the clamping members 31, 32 against, of course, the biasing force of the spring 50. The biasing force continues to resist the closing movement of the clamping members 31, 32 until, of course, the spring center line SA passes the pivot axis PA after which the spring forces now pivot the arms 33, 34 toward each other rapidly and abruptly "snapping" the same closed in overlapped relationship (FIG. 2) completely embracing or encapsulating the tailspring TS. At this point the person P simply maintains a grip on the handle 15 and manipulates the tow bar 10 to move the aircraft A as desired. In order to release the clamping means 11, the tails 47, 48 are simply manually pivoted toward each other, as indicated by the unnumbered headed arrows in FIG. 2 to overcome the biasing force of the spring 50. The biasing force of the spring 50 need but be manually overcome during the movement of the spring 50 from the position shown in FIG. 2 toward and to the phantom outline position (dead center) shown in FIG. 3 at which point the spring forces take over just after the dead center position to again abruptly "snap" the clamping members 31, 32 from the phantom outline to the solid outline position shown in FIG. 3. In the latter position the tails 47, 48 abut against the lateral sides (unnumbered) of the elongated member 12 and serve to limit through such abutment the full open position of the clamping members 31, 32, and thus the spacing between the respective noses 43, 44 thereof is accurately maintained.

From the foregoing it will be readily observed that the clamping means 11 can be readily and easily automatically closed by bearing the noses 45, 46 against the tailspring TS, and the opening force, though not automatic, is relatively low and need only be applied until such time as the dead center position of the spring 50 has been reached (phantom outline in FIG. 3). Thus, the relatively simple, inexpensive, yet highly efficient tow bar has been provided for the intended purpose of manually moving the tailwheel aircraft A.

In addition to the abutment provided by the tails 47, 48 against the lateral sides of the elongated member 12 when the clamping members 31, 32 are open, the clamping members 31, 32 are also provided with abutment means, stops, limits or tabs 29, 39, respectively. The tab 29 of the clamping member 31 projects upwardly, as viewed in FIG. 5 and is located generally at the juncture of the bight 37 and the tail 47. The tab 39 carried by the clamping member 32 projects downwardly (FIG. 5) and is located generally at the juncture of the bight 36 and the tail 48. The purpose of the tabs 29, 39 is to limit the closed position of the clamping members 31, 32, either in the presence of the tailspring TS or in the absence thereof when, for example, the tow bar 10 is merely stored with the clamping members 31, 32 closed. In the closed position of the clamping members 31, 32 the tab 29 abuts against the lateral edge (unnumbered) of the second arm 36, which is the uppermost edge as viewed in FIG. 3. In the same closed position of the clamping arm 32, the tab 39 abuts against the lateral edge of the second arm 36, which is the lowermost edge of the arm 36 in FIG. 3. In this fashion the clamping members 31, 32 cannot move beyond the solid line position of FIG. 2, irrespective of whether or not the tailwheel spring TS is clamped therebetween or embraced thereby.

In addition to providing the tow bar 10 with the protecting sleeve 16, both clamping members 31, 32 can be entirely covered with a thin plastic coating, including the tabs 29, 39, 53 and 54 to prevent the aircraft A from being damaged, as might otherwise occur if the clamping members 31, 32 were not so protectively coated. The spring 50 might also be a polyethylene or like plastic material coated spring, again to prevent damage to the aircraft A. In lieu of totally protectively coating the clamping members 31, 32, at least the handles 47, 48, and the tabs 29, 39, 53 and 54 should be coated both for protection purposes and, of course, to facilitate the gripping of the handles 47, 48. Similarly, the ends of the cross-bar 15 can be provided with protective plastic caps 59 (FIG. 2). Finally, the entirety of the cross bar or handle 15, the elongated member 12, the exposed portion of the plug 13 and the nuts and bolts 20, 21, 55 can also be totally coated, together with the plates 22, 23 so that the entirety of the overall tow bar 10 is protectively coated to prevent any damage whatever to an aircraft A when the tow bar 10 is being used as heretofore described (FIG. 1).

Although in a preferred embodiment of the invention as has been specifically illustrated and described herein, it is to be understood that minor variations may be made in the apparatus without departing from the spirit and scope of the invention as defined in the appended claims.

I claim:

1. A tow bar particularly adapted for use with tailwheel aircraft comprising an elongated member having opposite end portions, means at a first of said end portions for releasably clamping said elongated member to a tailspring of a tailwheel aircraft, said clamping means includes a pair of relatively movable clamping members, pivot means for pivotally connecting said clamping members to said elongated member first end portion for movement of said clamping members in generally parallel planes normal to the pivot axis of said pivot means, each clamping member being of a generally U-shaped configuration defined by a bight and first and second arms collectively defining therebetween a generally U-shaped slot, a first of each arm terminating in a first nose, a second of each arm terminating in a second nose, said second arms each being pivotally connected by said pivot means to said elongated member first end portion, each clamping member being relatively pivoted between a first open position at which said first arms first noses are in spaced relationship to each other to accommodate therebetween an aircraft tailwheel tailspring and a second closed position at which said first arms first noses are in contiguous relationship to each other to generally encircle therebetween an aircraft tailwheel tail spring, spring means for normally biasing said elongated members selectively to both said open and closed positions, means for connecting said spring menas to and between said clamping members at connection points occupying two different planes at opposite sides of said pivot means in the respective open and closed positions whereby said spring means biasingly retains said clamping means in the open position and bias said clamping members to said closed position after said spring means has passed a dead center plan through said pivot means, abutment means carried by each clamping member for contacting said elongated member first end portion in said open position and for contacting the adjacent clamping member second nose in said closed position under the influence of said spring means thereby maintaining said first arm first noses in predetermined relationship to accept and accommodate therebetween an aircraft tailwheel tailspring, said abutment means each being a tail carried in upstanding relationship by each elongated member.

2. The tow bar as defined in claim 1 wherein said first and second noses of each clamping member are at least in part located at opposite sides of a plan through said pivot means axis in said open position whereby said second noses, when brought into forceful contact with an aircraft tailwheel tailspring in said open position, will act against the biasing force of said spring means to move said clamping members toward the closed position thereof.

3. The tow bar as defined in claim 1 wherein said first arm first noses are in overlapped relationship to each other in said closed position.

4. The tow bar as defined in claim 1 wherein said connecting means include a tab carried by each clamping member, and said spring means is a coil spring having an end connected to each tab.

5. The tow bar as defined in claim 1 wherein said pivot means includes at least one ear carried by said elongated member first end portion and a pivot pin passing through openings of said ear and said second arms.

6. The tow bar as defined in claim 1 wherein said pivot means includes a pair of spaced ears carried by said elongated member first end portion receiving therebetween said second arms and a pivot pin passing through openings of said ears and said second arms.

7. A tow bar particularly adapted for use with tailwheel aircraft comprising an elongated member having opposite end portions, means at a first of said end portions for releasably clamping said elongated member to a tailspring of a tailwheel aircraft, said clamping means includes a pair of relatively movable clamping members, pivot means for pivotally connecting said clamping members to said elongated member first end portion for movement of said clamping members in generally parallel planes normal to the pivot axis of said pivot means, each clamping member being of a generally U-shaped configuration defined by a bight and first and second arms collectively defining therebetween a generally U-shaped slot, a first of each arm terminating in a first nose, a second of each arm terminating in a second nose, said second arms each being pivotally connected by said pivot means to said elongated member first end portion, each clamping member being relatively pivoted between a first open position at which said first arms first noses are in spaced relationship to each other to accommodate therebetween an aircraft tailwheel tailspring and a second closed position at which said first arms first noses are in overlapping relationship to each other to generally encircle therebetween an aircraft tailwheel tail spring, spring means for normally biasing said elongated members selectively to both said open and closed positions, means for connecting said spring means to and between said clamping members at connection points occupying two different planes at opposite sides of said pivot means in the respective open and closed positions whereby said spring means biasingly retains said clamping means in the open position and bias said clamping members to said closed position after said spring means has passed a dead center plan through said pivot means, said pivot means being a single pivot pin pivotally mounting said clamping members to each other and to said elongated member first end portin in scissor-like relationship whereby said single pivot permits both relative pivoting between said clamping members and relative pivoting movement of said elongated member relative to said clamping members, said first and second noses of each clamping member being at least in part located at opposite sides of a plane through said pivot pin axis in said open position whereby said noses when brought into forceful contact with an aircraft tailwheel tail spring in said open position will act against the biasing force of said spring means to move said clamping members toward the closed position thereof, and said first arm first noses pass through a plane taken through said elongated member axis and said pivot pin axis when moved from said open to said closed position thereby bringing said first arm first noses into overlapped relationship across said last-mentioned plane thereby preventing opening of said clamping members upon excessive forces being applied to said elongaated member while pulling an aircraft.

8. The tow bar as defined in claim 7 including abutment means carried by each clamping member for contacting said elongated member first end portion in said open position and for contacting the adjacent clamping member second nose in said closed position under the influence of said spring means thereby maintaining said first arm first noses in predetermined relationship to accept and encirclingly accommodate therebetween an aircraft tailwheel tail spring.

* * * * *